United States Patent
Matsuo

(10) Patent No.: US 12,091,048 B2
(45) Date of Patent: Sep. 17, 2024

(54) VEHICLE CONTROL SYSTEM AND COLLISION AVOIDANCE ASSISTANCE APPARATUS

(71) Applicant: TOYOTA JIDOSHA KABUSHIKI KAISHA, Toyota (JP)

(72) Inventor: Yoshiaki Matsuo, Izunokuni (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 382 days.

(21) Appl. No.: 17/647,767

(22) Filed: Jan. 12, 2022

(65) Prior Publication Data
US 2022/0234620 A1    Jul. 28, 2022

(30) Foreign Application Priority Data

Jan. 26, 2021 (JP) ................................ 2021-010597

(51) Int. Cl.
*B60W 60/00* (2020.01)
*B60W 30/09* (2012.01)

(52) U.S. Cl.
CPC ........ *B60W 60/0015* (2020.02); *B60W 30/09* (2013.01); *B60W 2552/10* (2020.02); *B60W 2554/4029* (2020.02); *B60W 2555/60* (2020.02); *B60W 2556/40* (2020.02); *B60W 2720/10* (2013.01)

(58) Field of Classification Search
CPC ............. B60W 60/0015; B60W 30/09; B60W 2552/10; B60W 2554/4029; B60W 2555/60; B60W 2556/40; B60W 2720/10; B60W 30/0956
See application file for complete search history.

(56) References Cited

U.S. PATENT DOCUMENTS

| | | | |
|---|---|---|---|
| 2011/0187515 A1 | 8/2011 | Saito et al. | |
| 2023/0264689 A1* | 8/2023 | Hiramatsu | .......... B60W 30/143 |
| | | | 701/301 |
| 2023/0347891 A1* | 11/2023 | Hiramatsu | ...... B60W 30/18154 |

FOREIGN PATENT DOCUMENTS

| | | | |
|---|---|---|---|
| JP | 2009137385 A | 6/2009 | |
| JP | 2010070069 A | 4/2010 | |
| JP | 2017224163 A | 12/2017 | |
| JP | 2019043405 A | 3/2019 | |
| JP | 2021-009624 A | 1/2021 | |

* cited by examiner

*Primary Examiner* — Russell Frejd
*Assistant Examiner* — Ana D Thomas
(74) *Attorney, Agent, or Firm* — Dickinson Wright, PLLC

(57) ABSTRACT

The vehicle control system is configured to execute autonomous driving and collision avoidance assistance. The autonomous driving is a process in which an ego-vehicle is autonomously driven based on necessary information for traveling including map information and information on a surrounding environment of the ego-vehicle. The collision avoidance assistance is a process in which the ego-vehicle is operated to avoid a collision in response to that a risk of collision of the ego-vehicle with a forward obstacle exceeds a threshold. The vehicle control system is configured to lower the threshold when the ego-vehicle travels, by the autonomous driving, in an area in which either one of an ego-lane and an opposite lane adjacent to the ego-lane is not travelable.

6 Claims, 5 Drawing Sheets

VEHICLE CONTROL SYSTEM AND COLLISION AVOIDANCE ASSISTANCE APPARATUS

CROSS-REFERENCE TO RELATED APPLICATION

The present application claims priority under 35 U.S.C. § 119 to Japanese Patent Application No. 2021-010597, filed Jan. 26, 2021, the contents of which application are incorporated herein by reference in their entirety.

BACKGROUND

Field

The present disclosure relates to a vehicle control system having a collision avoidance assistance function and a collision avoidance assistance apparatus.

Background Art

Various techniques have been proposed for avoiding a collision between a vehicle and an obstacle. For example, JP2010-070069A discloses a prior art relating to control of a vehicle in the case where there is a risk on both the left side and the right side in front of the vehicle. According to the prior art disclosed in JP2010-070069A, when the vehicle detects an oncoming vehicle approaching from the right front and detects a parked vehicle in the left front while traveling in a straight lane, a first risk of the vehicle colliding with the parked vehicle and a second risk of the vehicle colliding with the oncoming vehicle are calculated. Then, a first control threshold is set on the left side of the vehicle based on the first risk, a second control threshold is set on the right side of the vehicle based on the second risk, and actuators are controlled so that the vehicle travels between the first control threshold and the second control threshold.

However, the prior art disclosed in JP2010-070069A is directed to a specific situation in which there is a risk on both the left side and the right side in front of the vehicle, and does not correspond to a situation to which the present disclosure is directed. As references showing the state of the art in the technical field to which the present disclosure belongs, for example, JP2009-137385A, JP2019-043405A, and JP2017-224163A can be cited in addition to JP2010-070069A.

SUMMARY

The present disclosure is directed to a situation in which an ego-vehicle travels in an area in which either one of an ego-lane and an opposing lane adjacent to the ego-lane is not travelable. When the ego-lane is not travelable, the ego-vehicle must enter the opposite lane. And, when the opposite lane adjacent to the ego-lane is not travelable, there is a possibility that an oncoming vehicle enters the ego-lane. In these situations, the risk of collision of the ego-vehicle with an oncoming vehicle increases.

The present disclosure has been made in view of the above-described problems. A first object of the present disclosure is to provide a vehicle control system capable of reducing a risk of collision of an ego-vehicle with an oncoming vehicle when the ego-vehicle must enter an opposite lane, or when the opposite lane is not travelable and an oncoming vehicle may enter an ego-lane. A second object of the present disclosure is to provide a collision avoidance assistance apparatus capable of reducing a risk of collision of an ego-vehicle with an oncoming vehicle when the ego-vehicle must enter an opposite lane, or when the opposite lane is not travelable and an oncoming vehicle may enter an ego-lane.

A first vehicle control system according to the present disclosure comprises at least one memory storing at least one program and at least one processor coupled with the at least one memory. The at least one program is configured to cause the at least one processor to execute following processing. The processing includes autonomous driving in which an ego-vehicle is autonomously driven based on necessary information for traveling including map information and information on a surrounding environment of the ego-vehicle. Also, the processing includes collision avoidance assistance in which the ego-vehicle is operated to avoid a collision in response to that a risk of collision of the ego-vehicle with a forward obstacle exceeds a threshold. Furthermore, the processing includes lowering the threshold when the ego-vehicle travels, by the autonomous driving, in an area in which either one of an ego-lane and an opposite lane adjacent to the ego-lane is not travelable. Through the above processing, it is possible to reduce a risk of collision of the ego-vehicle with an oncoming vehicle by making the collision avoidance assistance easy to be activated when the ego-lane is not travelable and the ego-vehicle must enter the opposite lane. In addition, even when the opposite lane is not travelable and there is a possibility that an oncoming vehicle enters the ego-lane, it is possible to reduce the risk of collision of the ego-vehicle with an oncoming vehicle by making the collision avoidance assistance easy to be activated.

In the first vehicle control system according to the present disclosure, the autonomous driving may include causing the vehicle to travel along a target trajectory determined based on the necessary information. Furthermore, the lowering the threshold may include lowering the threshold when the ego-lane is not travelable and the target trajectory protrudes into the opposite lane. When the risk of collision is increased depending on a positional relationship between the target trajectory and the opposite lane, the risk of collision of the ego-vehicle with an oncoming vehicle can be reduced by making the collision avoidance assistance easy to be activated.

In the first vehicle control system according to the present disclosure, the autonomous driving may include temporarily stopping the vehicle before the vehicle enters the above area. Furthermore, the lowering the threshold may include lowering the threshold when or after the vehicle restarts after a temporary stop. Lowering the threshold in conjunction with temporarily stopping the ego-vehicle can reduce the risk of collision.

In the first vehicle control system according to the present disclosure, the at least one program may be configured to cause the at least one processor to execute the autonomous driving according to a stop instruction and a start instruction when the stop instruction and the start instruction are performed by a traffic signal or a guide person. Furthermore, the at least one program may be configured to cause the at least one processor to execute holding the threshold or reducing a lowering amount of the threshold when a stop instruction and a start instruction are performed by a traffic signal or a guide person. If a stop instruction and a start instruction are given by a traffic signal or a guide person, it is unlikely that the ego-vehicle will encounter an oncoming vehicle when traveling in the above area. In such a case, by holding the threshold or reducing a lowering amount of the threshold, it is possible to reduce that the collision avoidance assistance is unnecessarily activated by false detection.

A second vehicle control system according to the present disclosure comprises at least one memory storing at least one program and at least one processor coupled with the at least one memory. The at least one program is configured to cause the at least one processor to execute following processing. The processing includes autonomous driving in which a vehicle is caused to travel along a target trajectory determined based on necessary information for traveling including map information and information on a surrounding environment of the vehicle. Also, the processing includes collision avoidance assistance in which the ego-vehicle is operated to avoid a collision in response to that a risk of collision of the ego-vehicle with a forward obstacle exceeds a threshold. Furthermore, the processing includes lowering the threshold when the target trajectory protrudes into an opposite lane. Through the above processing, when the target trajectory protrudes into the opposite lane, for example, when the ego-vehicle protrudes into the opposite lane in order to overtake a vehicle ahead, it is possible to reduce the risk of collision of the ego-vehicle with an oncoming vehicle by making the collision avoidance assistance easy to be activated.

A collision avoidance assistance apparatus according to the present disclosure is an apparatus configured to operate in response to that a risk of collision of an ego-vehicle with a forward obstacle exceeds a threshold. The collision avoidance assistance apparatus according to the present disclosure is configured to lower the threshold when the ego-vehicle travels in an area in which either one of an ego-lane and an opposite lane adjacent to the ego-lane is not travelable. By such configuration, when the ego-lane is not travelable and the ego-vehicle must enter the opposite lane, the collision avoidance assistance apparatus becomes easy to be activated and the risk of collision of the ego-vehicle with an oncoming vehicle is reduced. Also, even when the opposite lane is not travelable and an oncoming vehicle may enter the ego-lane, the collision avoidance assistance apparatus becomes easy to be activated and the risk of collision of the ego-vehicle with an oncoming vehicle is reduced.

According to the present disclosure, the collision avoidance assistance can be activated easily to reduce the risk of collision of the ego-vehicle with an oncoming vehicle in the case where the ego-lane is not travelable and the ego-vehicle is unavoidable to enter the opposite lane, or in the case where the opposite lane is not travelable and an oncoming vehicle is likely to enter the ego-lane.

DETAILED DESCRIPTION

Figure 1:
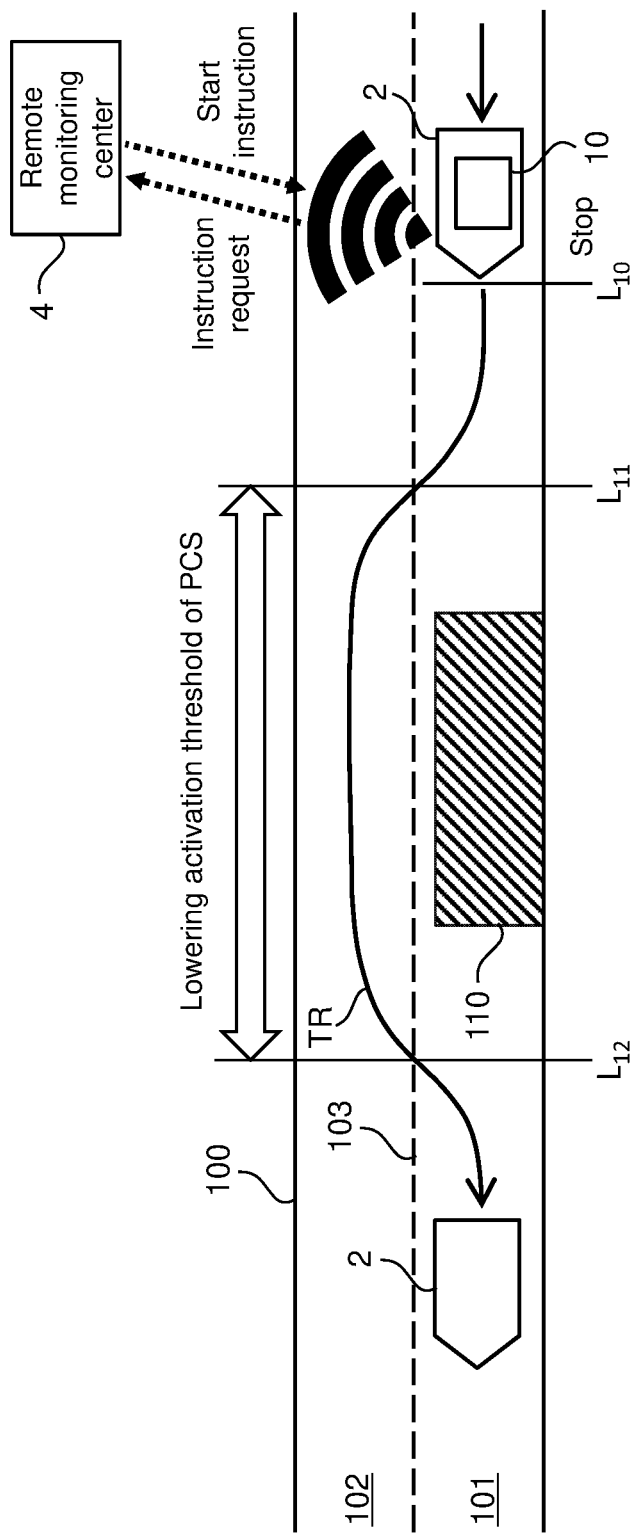
FIG. 1 is a diagram for explaining an outline of vehicle control in a one-side traffic area according to an embodiment of the present disclosure.

Hereunder, an embodiment of the present disclosure will be described with reference to the drawings. Note that when the numerals of numbers, quantities, amounts, ranges and the like of respective elements are mentioned in the embodiments shown as follows, the present disclosure is not limited to the mentioned numerals unless specially explicitly described otherwise, or unless the disclosure is explicitly designated by the numerals theoretically. Furthermore, structures and steps that are described in the embodiments shown as follows are not always indispensable to the disclosure unless specially explicitly shown otherwise, or unless the disclosure is explicitly designated by the structures or the steps theoretically.

1. Outline of Vehicle Control System 1-1. Autonomous Driving and Collision Avoidance Assistance A vehicle control system according to the present embodiment is a system configured to be able to execute autonomous driving for autonomously driving an ego-vehicle and collision avoidance assistance for assisting avoidance of collision of the ego-vehicle with an obstacle.

The autonomous driving is carried out based on necessary information for traveling including map information and information on a surrounding environment of the ego-vehicle. Specifically, an optimum route to a destination is determined based on the map information. Then, a traveling plan is drafted to make the ego-vehicle travel safely along the optimum route while following traffic rules. The traveling plan includes operations such as maintaining a current traveling lane, performing a lane change, etc.

In the autonomous driving, the target trajectory is generated on the basis of the traveling plan. The target trajectory is a trajectory that the ego-vehicle should ultimately follow, and is determined after considering a collision of the ego-vehicle with all obstacles in front of the ego-vehicle obtained from the information on the surrounding environment of the ego-vehicle. The target trajectory includes a set of target positions of the ego-vehicle in the road on which the ego-vehicle travels, and a target speed for each target position. In the autonomous driving, in order to make the ego-vehicle follow the target trajectory, a deviation between the ego-vehicle and the target trajectory (lateral deviation, yaw angle deviation, speed deviation, etc.) is calculated, and then, the steering, braking, or driving of the ego-vehicle is controlled so that the deviation is reduced.

The collision avoidance assistance is a function to operate the ego-vehicle so as to avoid a collision or reduce damage caused by a collision when it is determined that there is a high possibility that an obstacle existing in front of the ego-vehicle will collide with the ego-vehicle. One example of the collision avoidance assistance is a PCS (Pre-Crash Safety). In the PCS, automatic braking by a braking actuator is used as a method of collision avoidance. Hereinafter, it is assumed that the collision avoidance assistance according to the present embodiment is the PCS.

A need to actuate the PCS is determined based on a relative relationship between the ego-vehicle and an obstacle. In the present embodiment, the lateral position of the obstacle with respect to the ego-vehicle and the TTC (Time to Collision) of the obstacle with respect to the ego-vehicle are used for determination. Specifically, the PCS is activated when an obstacle whose lateral position is within a predetermined range is certified as an actuation target of the PCS and the TTC of the obstacle certified as the actuation target falls below a predetermined limit time.

The magnitude of the risk of collision of the ego-vehicle with an obstacle becomes larger as the lateral position of the obstacle becomes closer to the ego-vehicle, and becomes larger as the TTC of the obstacle becomes smaller. In the present embodiment, the risk of collision is represented by a function using the lateral position and the TTC as parameters. The PCS is then activated when the risk of collision exceeds a predetermined threshold. The threshold of the risk of collision at which the PCS is activated (the activation threshold) is variable. If the activation threshold of the PCS is lowered, the PCS becomes easy to be activated with respect to an obstacle away from the ego-vehicle. Lowering the activation threshold of the PCS includes widening the range for the lateral position of the obstacle to be certified as the actuation target of the PCS and increasing the time limit of the TTC at which the PCS is actuated with respect to the obstacle certified as the actuation target.

1-2. Summary of Vehicle Control in One-Side Traffic Area

The vehicle control according to the present embodiment is characterized in that the vehicle control is performed in a one-side traffic area in which either one of the ego-lane and the opposite lanes adjacent to the ego-lane is not travelable. The one-side traffic area has two cases, that is, one case in which only the opposite lane is travelable and another case in which only the ego-lane is travelable. In the former case, a first situation occurs in which the ego-vehicle must enter the opposite lane. In the latter case, a second situation occurs in which an oncoming vehicle may enter the ego-lane.

Figure 2:
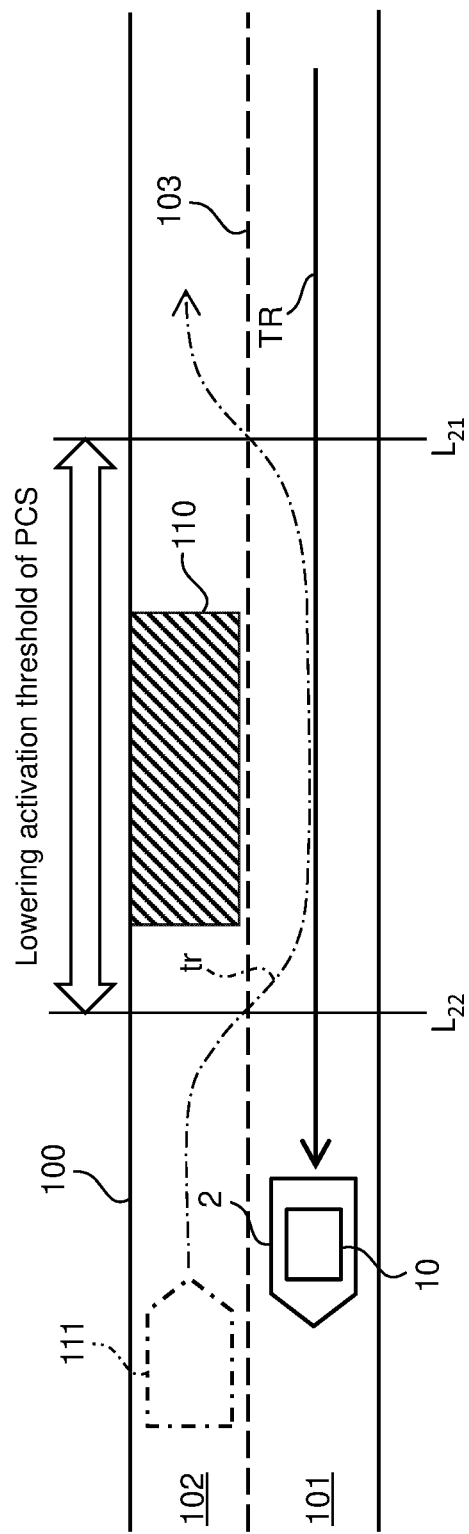
FIG. 2 is a diagram for explaining an outline of vehicle control in a one-side traffic area according to the embodiment.

FIG. 1 is a diagram for explaining an outline of the vehicle control in the first situation. FIG. 2 is a diagram for explaining an outline of the vehicle control in the second situation. In each situation, a vehicle (ego-vehicle) 2 is traveling on an opposing two-lane road 100 in which an ego-lane 101 and an opposite lane 102 are separated by a center line 103. The vehicle 2 is an autonomous driving vehicle in which a vehicle control system 10 capable of executing autonomous driving and collision avoidance assistance is mounted. Further, the vehicle 2 is also a remote supported vehicle that communicates with a remote monitoring center 4 and is operated by remote assistance received from the remote monitoring center 4.

In the first situation shown in FIG. 1, there is an obstacle 110 in front of the ego-lane 101. The obstacle 110 blocks the ego-lane 101 and makes the ego-lane 101 not travelable. Therefore, in order for the vehicle 2 to proceed forward, once the vehicle 2 must enter the opposite lane 102 so as to bypass the obstacle 110. Examples of the obstacle 110 may include a construction site or a parked large vehicle such as a truck or bus. The obstacle 110 is comprehensively detected by external sensors mounted on the vehicle 2, or is acquired from a road traffic information communication system. The road traffic information communication system provides road traffic information to vehicles by beacons installed on roads and FM multiplex broadcasting.

In the first situation, the vehicle control system 10 temporarily stops the vehicle 2 in front of the obstacle 110. The stopping position $L_{10}$ of the vehicle 2 is determined by the distance to the obstacle 110. After temporarily stopping, the vehicle control system 10 requests a start instruction from the remote monitoring center 4. The vehicle control system 10 transmits to the remote monitoring center 4 an image of surroundings of the vehicle 2 captured by a camera of the vehicle 2 when requesting remote assistance from the remote monitoring center 4. A remote operator in the remote monitoring center 4 checks a condition of the surroundings of the vehicle 2 from a camera image displayed on a display in the remote monitoring center 4. If it is determined that there is no problem, the remote operator transmits the start instruction to the vehicle control system 10.

Upon receiving the start instruction, the vehicle control system 10 starts the vehicle 2 and generates a target trajectory TR that passes through the opposite lane 102 temporarily so as to bypass the obstacle 110. The target trajectory TR is generated so that the distance that the vehicle 2 passes through the opposite lane 102 is as short as possible and that the vehicle 2 can safely return to the ego-lane 101. The vehicle 2 travels along the target trajectory TR and enters the opposite lane 102 beyond the center line 103. Then, after passing beside the obstacle 110, the vehicle 2 again returns to the ego-lane 101 beyond the center line 103.

The risk of collision of the vehicle 2 with an oncoming vehicle increases from the time the vehicle 2 enters the opposite lane 102 beyond the center line 103 until it returns to the ego-lane 101 again, i.e., while the vehicle 2 is traveling on the opposite lane 102. Therefore, the vehicle control system 10 lowers the activation threshold of the PCS below a normal value at the position $L_{11}$ where the vehicle 2 enters the opposite lane 102 beyond the centerline 103. The position $L_{11}$ where the activation threshold of the PCS is lowered may, in particular, be a position where the target trajectory TR intersects the center line 103. Then, at the position $L_{12}$ where the vehicle 2 returns from the opposite lane 102 to the ego-lane 101, the vehicle control system 10 returns the activation threshold of the PCS to the normal value. The position $L_{12}$ where the activation threshold of the PCS is reset may, in particular, be a position where the target trajectory TR intersects the center line 103 again.

As described above, in the first situation, the vehicle control system 10 temporarily lowers the activation threshold of the PCS while the vehicle 2 is in the opposite lane 102. This makes the PCS easy to be activated and reduces the risk of collision of the vehicle 2 with an oncoming vehicle. Incidentally, it is assumed that an oncoming vehicle appears during the vehicle 2 is traveling in the opposite lane 102 for bypassing the obstacle 110 and then the PCS is activated. If the vehicle 2 is stopped by actuation of the PCS, for example, the vehicle 2 may move backward by autonomous traveling, or the remote operator may remotely operate the vehicle to move backward.

In the second situation shown in FIG. 2, an obstacle 110 is in the opposite lane 102. The obstacle 110 blocks the opposite lane 102 and makes the opposite lane 102 not travelable. For this reason, an oncoming vehicle 111 traveling in the opposite lane 102 must enter the ego-lane 101 once to bypass the obstacle 110.

In the second situation, since the vehicle traveling in the ego-lane 101 has priority over the oncoming vehicle 111, it is likely that the vehicle traveling in the ego-lane 101 does not anticipate a temporary stop of a preceding vehicle. If the vehicle 2 has a temporary stop unnecessarily, there is a possibility that the vehicle-to-vehicle distance between the vehicle 2 and the subsequent vehicle is adversely affected, that is, the operation of the subsequent vehicle is adversely affected. Therefore, in the second situation, the vehicle control system 10 makes the vehicle 2 pass beside the obstacle 110 without temporarily stopping the vehicle 2.

However, there may be an oncoming vehicle 111 entering the ego-lane 101 from the opposite lane 102 when the vehicle 2 is passing beside the obstacle 110. Therefore, the vehicle control system 10 temporarily lowers the activation threshold of the PCS than the normal value when the vehicle 2 passes beside the obstacle 110. More specifically, from a trajectory tr of the oncoming vehicle 111 predicted from the position and size of the obstacle 110, the position $L_{22}$ where the oncoming vehicle 111 enters the ego-lane 101 beyond the center line 103 and the position $L_{21}$ where the oncoming vehicle 111 returns from the ego-lane 101 to the opposite lane 102 are predicted. Then, the section including at least from the position $L_{21}$ to the position $L_{22}$ is a section where the activation threshold of the PCS is lowered.

As described above, in the second situation, the vehicle control system 10 makes the vehicle pass beside the obstacle 110 without temporarily stopping the vehicle 2 while temporarily lowering the activation threshold of the PCS. Thus, even when the oncoming vehicle 111 appears in the ego-lane 101, the PCS can be easily activated and the risk of collision of the vehicle 2 with the oncoming vehicle 111 can be reduced. Incidentally, it is assumed that the oncoming vehicle 111 appears during the vehicle 2 is passing beside the obstacle 110 and then the PCS is activated. If the vehicle 2 is stopped by the activation of the PCS, for example, the vehicle 2 may advance in autonomous traveling after waiting for the oncoming vehicle 111 to move backward, or the remote operator may advance the vehicle 2 while monitoring backward movement of the oncoming vehicle 111.

Figure 3:
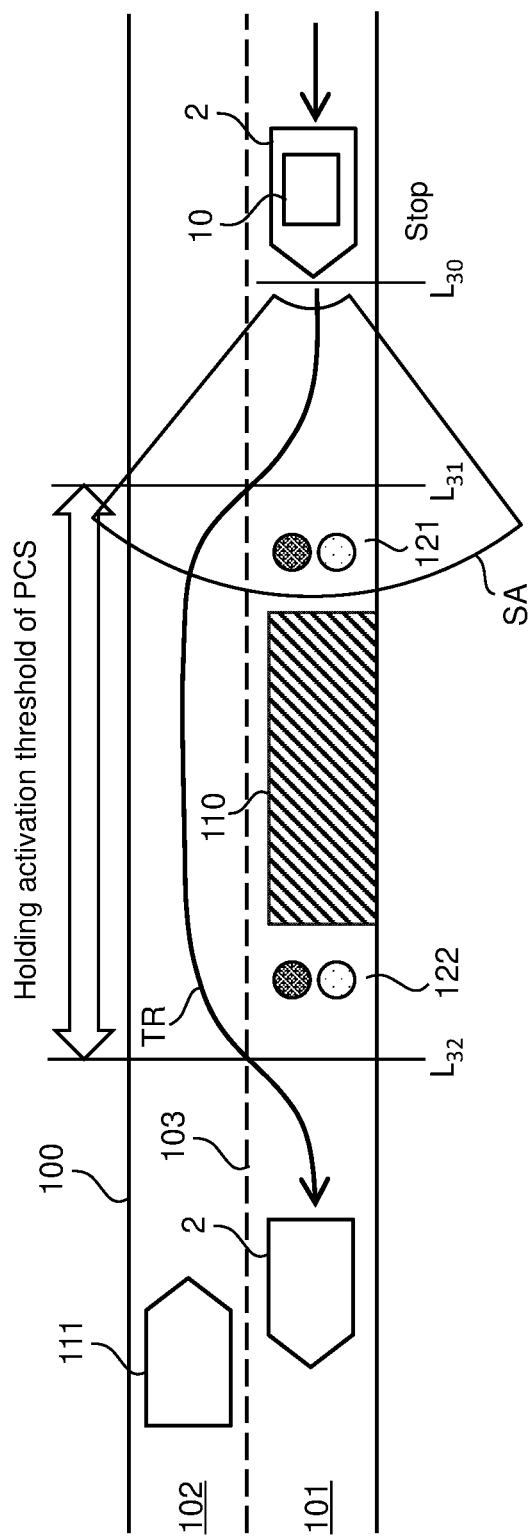
FIG. 3 is a diagram for explaining an outline of vehicle control in a one-side traffic area according to the embodiment.

FIG. 3 shows a third situation to which the vehicle control according to the present embodiment is directed. In the third situation, as in the first situation, an obstacle 110 in front of the ego-lane 101 creates a one-side traffic area where only the opposite lane 102 is travelable. Therefore, in order for the vehicle 2 to proceed forward, once the vehicle 2 must enter the opposite lane 102 so as to bypass the obstacle 110. However, in the third situation, traffic signals 121, 122 are installed in front of and behind the obstacle 110. A traffic signal 121 in front of the obstacle 110 as viewed from the vehicle 2 is used for safety confirmation of the vehicle 2 passing through the ego-lane 101, and a traffic signal 122 behind the obstacle 110 as viewed from the vehicle 2 is used for safety confirmation of the oncoming vehicle 111 passing through the opposite lane 102. The obstacle 110 in the third situation is specifically a construction site.

In the third situation, the vehicle control system 10 recognizes the traffic signal 121 present in a foreword detection range SA by an external sensor mounted on the vehicle 2. Then, the vehicle control system 10 determines whether a signal color of the traffic signal 121 is red or blue by an image recognition process for a camera image. If the signal color is blue, the vehicle control system 10 passes the vehicle 2 as it is. If the signal color is red, the vehicle control system 10 stops the vehicle 2 temporarily, and starts the vehicle 2 after the signal color changes to blue.

In the third situation, the oncoming vehicle 111 also follows the traffic signal 122 as the vehicle 2 follows the traffic signal 121. While the vehicle 2 is traveling on the opposite lane 102, the traffic light 122 is red so that the oncoming vehicle 111 is stopped behind the obstacle 110. Thus, in the third situation, it is unlikely that the vehicle 2 will encounter the oncoming vehicle 111 when traveling on the opposite lane 102. Thus, the vehicle control system 10 holds the activation threshold of the PCS at the normal value rather than lowering the activation threshold of the PCS as in the first situation.

Incidentally, the vehicle control in the third situation is also applied to a case where the traffic signals are installed in front of and behind the obstacle 110 in the opposite lane 102 as in the second situation. Again, the oncoming vehicle 111 also follows the traffic signal as well as the vehicle 2 follows the traffic signal. Therefore, rather than lowering the activation threshold of the PCS as in the second situation, the activation threshold of the PCS is held at the normal value.

As described above, the vehicle control system 10 holds the activation threshold of the PCS to the normal value in a situation where the stop instruction and the start instruction are generated by the traffic signals 121, 122. If the activation threshold of the PCS is lowered, the activation sensitivity of the PCS is increased, while the PCS is easily activated unnecessarily by false detection. In the first and second situations, since it is prioritized to reduce the risk of collision of the vehicle 2 with an oncoming vehicle, the activation threshold of the PCS is lowered. However, in the third situation, the risk of collision of the vehicle 2 with an oncoming vehicle is not as high as in the first and second situations. Therefore, the activation threshold of the PCS can be held, thereby reducing unnecessary activation of the PCS due to false detection.

Figure 4:
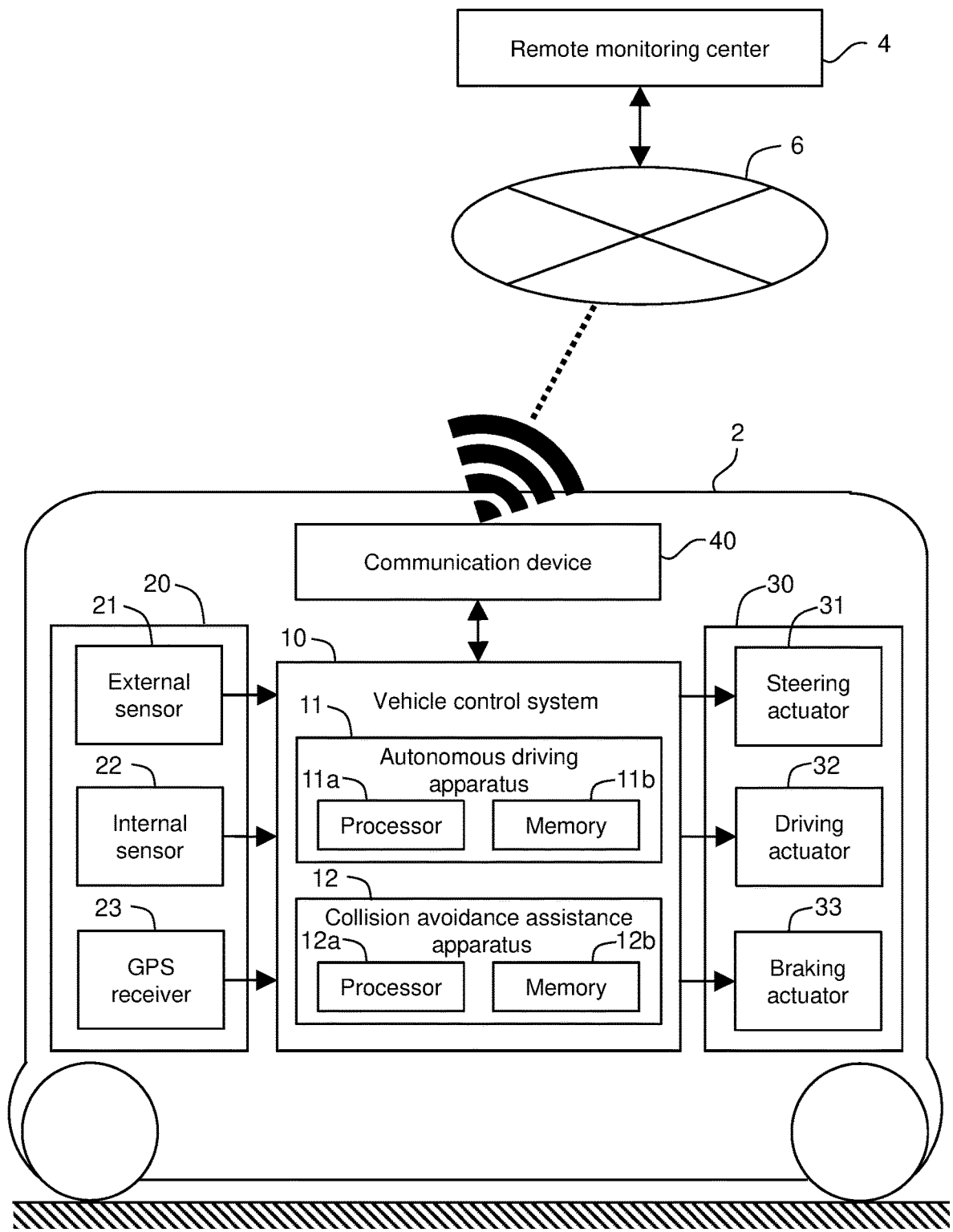
FIG. 4 is a block diagram showing a configuration of a vehicle control system according to the embodiment.

2. Configuration and Function of Vehicle Control System 2-1. Configuration of Vehicle Control System FIG. 4 is a diagram showing an example of a configuration of the vehicle control system 10 according to the present embodiment and the vehicle 2 to which the vehicle control system 10 is applied. The vehicle 2 comprises the vehicle control system 10, on-board sensors 20 for inputting information to the vehicle control system 10, and vehicle actuators 30 operated by a signal output from the vehicle control system 10. In addition, the vehicle 2 comprises a communication device 40 that can be connected to a communication network 6 by mobile communication such as 4G or 5G. The vehicle control system 10 communicates with the remote monitoring center 4 via the communication device 40. The vehicle control system 10, the on-board sensors 20, the vehicle actuators 30, and the communication device 40 are connected by an in-vehicle network.

The on-board sensors 20 include an external sensor 21, an internal sensor 22, and a GPS receiver 23. The external sensor 21 is a sensor for obtaining information on the surrounding environment of the vehicle 2. The external sensor 21 includes a camera, a millimeter-wave radar, and a LiDAR. Based on the information obtained by the external sensor 21, processing such as detection of an object existing around the vehicle 2, measurement of a relative position and relative speed of a detected object with respect to the vehicle 2, and recognition of a shape of the detected object is performed. The internal sensor 22 is a sensor for obtaining information on the movement of the vehicle 2. The inner sensor 22 includes, for example, a wheel speed sensor, an acceleration sensor, a yaw rate sensor, and a steering angle sensor. The GPS receiver 23 is used to obtain information on the current position of the vehicle 2. In addition to these, the vehicle 2 is also provided with a receiver for receiving information from the road traffic information communication system.

The vehicle actuators 30 includes a steering actuator 31 for steering the vehicle 2, a drive actuator 32 for driving the vehicle 2, and a braking actuator 33 for braking the vehicle 2. The steering actuator 31 includes, for example, a power steering system, a steer-by-wire steering system, and a rear wheel steering system. The drive actuator 32 includes, for example, an engine, an EV system, and a hybrid system. The braking actuator 33 includes, for example, a hydraulic brake, and a power regenerative brake.

The vehicle control system 10 includes an autonomous driving apparatus 11 and a collision avoidance assistance apparatus 12. As described above, the collision avoidance assistance apparatus 12 according to the present embodiment is a PCS. The autonomous driving apparatus 11 and the collision avoidance assistance apparatus 12 are independent ECUs (Electronic Control Unit). The autonomous driving apparatus 11 includes a processor 11a and a memory 11b. The collision avoidance assistance apparatus 12 also includes a processor 12a and a memory 12b. The memories 11b, 12b store various programs and data. The memories 11*b*, 12*b* described herein may include, in addition to a narrowly defined memory such as a RAM (Random Access Memory), a data storage device such as a magnetic disk such as an HDD, an optical disk such as a DVD, or a flash memory storage device such as an SSD. Necessary information is input and output between the autonomous driving apparatus 11 and the collision avoidance assistance apparatus 12 via, for example, CAN communication.

The autonomous driving apparatus 11 is responsible for the management of the autonomous driving of the vehicle 2 among the functions of the vehicle control system 10. The memory 11*b* of the autonomous driving apparatus 11 stores an autonomous driving program executable by the processor 11*a* and various information related thereto. The information related to the autonomous driving program includes map information. The map information may be stored in advance in the memory 11*b*, or may be downloaded from an external server via the communication network 6. Furthermore, the map information on the external server may be referred to. When the autonomous driving program is executed by the processor 11*a*, the processor 11*a* obtains sensor information from the external sensor 21, recognizes the position of the vehicle 2 on the map, and recognizes the situation around the vehicle 2. The processor 11*a* makes a traveling plan of the vehicle 2 during autonomous driving based on the position of the vehicle 2 on the map and the situation around the vehicle 2. In addition, the processor 11*a* generates a target trajectory based on the traveling plan and operates the vehicle actuators 30 such that the vehicle 2 follows the target trajectory.

The collision avoidance assistance apparatus 12 is responsible for the management of the activation of the PCS among the functions of the vehicle control system 10. The memory 12*b* of the collision avoidance assistance apparatus 12 stores a collision avoidance assistance program executable by the processor 12*a* and various information related thereto. By executing the collision avoidance assistance program by the processor 12*a*, the processor 12*a* detects an obstacle in front of the vehicle 2 by the external sensor 21 and calculates the risk of collision of the vehicle 2 with the obstacle based on the information obtained from the external sensor 21 and the internal sensor 22. Then, if the risk of collision exceeds the activation threshold of the PCS, the processor 12*a* activates the PCS to avoid collision of the vehicle 2 with the obstacle by automatic braking by the braking actuator 33. Further, as described with reference to FIGS. 1 to 3, when the vehicle 2 travels in an area where one of the ego-lane and the opposite lane is not travelable, the processor 11*a* changes the activation threshold of the PCS according to the situation in which the vehicle 2 is placed.

2-2. Procedure for Vehicle Control by the Vehicle Control System

Figure 5:
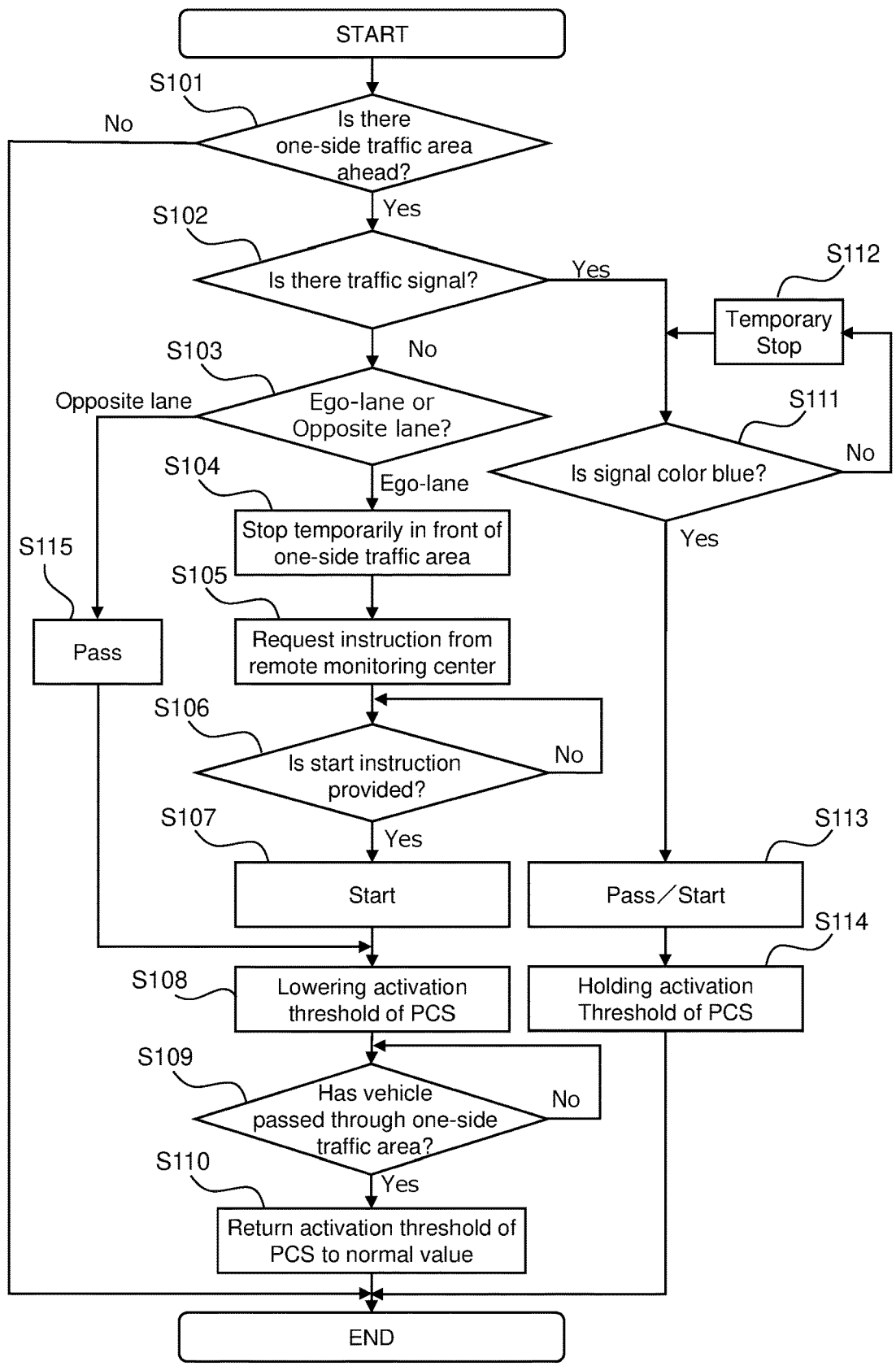
FIG. 5 is a flowchart of vehicle control according to the embodiment.

Next, the procedure of the vehicle control by the vehicle control system 10, in particular, the procedure of the vehicle control when there is a one-side traffic area in front of the vehicle 2 will be described with reference to a flowchart shown in FIG. 5.

First, the vehicle control system 10 determines whether there is a one-side traffic area in front of the vehicle 2 based on the information obtained from the external sensor 21 and the road traffic information communication system. When there is no one-side traffic area in front of the vehicle 2, the vehicle control system 10 skips all processes in this flowchart and holds the activation threshold of the PCS at the normal value (step S101).

When there is a one-side traffic area in front of the vehicle 2, the vehicle control system 10 determines whether a traffic signal is provided in front of the one-side traffic area based on the information obtained by the external sensor 21 (step S102). When a traffic signal is provided, the vehicle control system 10 determines whether the signal color of the traffic signal is blue or red based on a camera image (step S111). When the signal color is red, the vehicle control system 10 stops the vehicle 2 temporarily in front of the traffic signal (step S112).

When the signal color is blue, the vehicle control system 10 passes the vehicle 2 without temporarily stopping the vehicle 2. Further, when the signal color is changed to blue in a situation where the vehicle 2 is stopped temporarily, the vehicle control system 10 restarts the vehicle 2 (step S113). When a traffic signal is provided in the one-side traffic area, not only the vehicle 2 but also an oncoming vehicle follows the signal color of the traffic signal. Thus, the vehicle control system 10 holds the activation threshold of the PCS at the normal value while the vehicle 2 is passing through the one-side traffic area (step S114).

When no traffic signal is provided in the one-side traffic area, the vehicle control system 10 determines which side of the ego-lane and the opposite lane is not travelable (step S103). When the opposite lane is not travelable, the ego-lane is the priority lane. In this case, the vehicle control system 10 passes the vehicle 2 through the one-side traffic area without temporarily stopping the vehicle 2 (step S115).

Although the vehicle 2 passes through the one-side traffic area while traveling in the ego-lane, there is a possibility that an opposing vehicle will move to the ego-lane from the opposite lane. Therefore, the vehicle control system 10 lowers the activation threshold of the PCS than the normal value (step S108). The activation threshold of the PCS remains lowered until the vehicle 2 passes through the one-side traffic area (step S109). Then, after the vehicle 2 passes through the one-side traffic area, the vehicle control system 10 returns the activation threshold of the PCS to the normal value (step S110).

When no traffic signal is provided in the one-side traffic area and the ego-lane is not travelable, the vehicle control system 10 stops the vehicle 2 temporarily in front of the one-side traffic area (step S104). Next, the vehicle control system 10 communicates with the remote monitoring center 4 using the communication device 40 to transmit the camera image of the surroundings of the vehicle 2 to the remote monitoring center 4 and request a start instruction from the remote monitoring center 4 (step S105). The vehicle control system 10 continues the temporary stopping of the vehicle 2 until the start instruction is issued from the remote monitoring center 4 (step S106). Then, when the start instruction is issued from the remote monitoring center 4, the vehicle control system 10 starts the vehicle 2 (step S107).

Although the situation of the opposite lane has been checked by the remote operator in the remote monitoring center 4, there is a possibility that an oncoming vehicle appears in front of the vehicle 2 after the vehicle 2 enters the opposite lane. Therefore, the vehicle control system 10 lowers the activation threshold of the PCS than the normal value (step S108). The activation threshold of the PCS remains lowered until the vehicle 2 passes through the one-side traffic area (step S109). Then, after the vehicle 2 passes through the one-side traffic area and returns to the ego-lane, the vehicle control system 10 returns the activation threshold of the PCS to the normal value (step S110).

According to the vehicle control according to the above-described procedure, it is possible to make the PCS easy to be activated in the case where the vehicle 2 must enter the opposite lane because the ego-lane is not travelable, and in the case where the opposite lane is not travelable and an oncoming vehicle may enter the ego-lane. As a result, it is possible to reduce the risk of collision of the vehicle 2 with an oncoming vehicle in the one-side traffic area. Further, when a traffic signal is provided in the one-side traffic area, it is unlikely that the vehicle will encounter an oncoming vehicle when the vehicle 2 travels in the one-side traffic area. In such a case, since the activation threshold of the PCS is held, it is possible to reduce unnecessary activation of the PCS due to false detection.

3. Other Embodiments

In the first situation shown in FIG. 1, when an oncoming vehicle traveling in the opposite lane is not detected by the external sensor 21, the activation threshold of the PCS may be lowered below the normal value and the vehicle 2 may be allowed to pass through the one-side traffic area without temporarily stopping. Also, in the third situation shown in FIG. 3, the activation threshold of the PCS may be lowered, instead of being held, with a lowering amount of the activation threshold smaller than a lowering amount of the activation threshold in the first and second situations. In the third situation shown in FIG. 3, when there is a guide person instead of the traffic signal, the stop and the start of the vehicle 2 may be instructed according to the actions of the guide person. In this case, the actions of the guide person and the instruction contents are associated in advance.

The example in which the vehicle 2 enters the opposite lane is not limited to the case in which the ego-lane is not travelable and the vehicle 2 must enter the opposite lane. For example, the vehicle 2 may enter the opposite lane to overtake a preceding vehicle. In such a case as well as in the first situation, lowering the activation threshold of the PCS below the normal value may make the PCS easy to be activated and reduce the risk of collision of the vehicle 2 with an oncoming vehicle. Therefore, when the target trajectory determined based on the necessary information for traveling including the map information and the information on the surrounding environment of the vehicle 2 protrudes to the opposite lane beyond the center line, the vehicle control system 10 may lower the activation threshold of the PCS.

In the above-described embodiment, the PCS in which the collision avoidance is performed by braking is exemplified as the collision avoidance assistance, but the collision avoidance assistance by steering or the collision avoidance assistance by both braking and steering is also possible. For example, the collision avoidance assistance by steering is effective when the ego-vehicle returns to the ego-lane because an oncoming vehicle is found at the moment when the ego-vehicle tries to enter the opposite lane beyond the center line, or when the opposite lane including the road shoulder is sufficiently wide. In addition, even in the section where the ego-vehicle passes through an obstacle such as a construction site and returns to the ego-lane, collision of the ego-vehicle with an oncoming vehicle can be avoided by steering the ego-vehicle toward the ego-lane.

In the above embodiment, the function of the collision avoidance assistance is implemented in an ECU separate from the autonomous driving apparatus 11, the function of the collision avoidance assistance can also be incorporated in the autonomous driving apparatus 11. That is, the collision avoidance assistance program executable by the processor 11a and various information related thereto may be stored in the memory 11b of the autonomous driving apparatus 11. That is, as one application of the autonomous driving apparatus 11, the function of the collision avoidance assistance may be realized.

Further, the collision avoidance assistance apparatus according to the present disclosure can be applied not only to the autonomous driving vehicle such as the vehicle 2 of the embodiment described above, also to the manual driving vehicle driven by a driver.

What is claimed is:

1. A vehicle control system, comprising:
at least one memory storing at least one program; and
at least one processor coupled with the at least one memory,
wherein the at least one program is configured to cause the at least one processor to execute:
autonomous driving in which an ego-vehicle is autonomously driven based on necessary information for traveling including map information and information on a surrounding environment of the ego-vehicle;
collision avoidance assistance in which the ego-vehicle is operated to avoid a collision in response to that a risk of collision of the ego-vehicle with a forward obstacle exceeds a threshold; and
lowering the threshold when the ego-vehicle travels, by the autonomous driving, in an area in which either one of an ego-lane and an opposite lane adjacent to the ego-lane is not travelable.

2. The vehicle control system according to claim 1, wherein:
the autonomous driving includes causing the ego-vehicle to travel along a target trajectory determined based on the necessary information; and
the lowering the threshold includes lowering the threshold when the ego-lane is not travelable and the target trajectory protrudes into the opposite lane.

3. The vehicle control system according to claim 1, wherein:
the autonomous driving includes temporarily stopping the ego-vehicle before the ego-vehicle enters the area; and
the lowering the threshold includes lowering the threshold when or after the ego-vehicle restarts after temporary stop.

4. The vehicle control system according to claim 3, wherein the at least one program is configured to cause the at least one processor to execute:
the autonomous driving according to a stop instruction and a start instruction when the stop instruction and the start instruction are performed by a traffic light or a guide person; and
holding the threshold or reducing a lowering amount of the threshold when the stop instruction and the start instruction are performed by the traffic light or the guide person.

5. A vehicle control system, comprising:
at least one memory storing at least one program; and
at least one processor coupled with the at least one memory,
wherein the at least one program is configured to cause the at least one processor to execute:
autonomous driving in which an ego-vehicle is caused to travel along a target trajectory determined based on necessary information for traveling including map information and information on a surrounding environment of the ego-vehicle;
collision avoidance assistance in which the ego-vehicle is operated to avoid a collision in response to that a risk of collision of the ego-vehicle with a forward obstacle exceeds a threshold; and
lowering the threshold when the target trajectory protrudes into an opposite lane.

6. A collision avoidance assistance apparatus configured to operate in response to that a risk of collision of an ego-vehicle with a forward obstacle exceeds a threshold,
   wherein the collision avoidance assistance apparatus is configured to lower the threshold when the ego-vehicle travels in an area in which either one of an ego-lane and an opposite lane adjacent to the ego-lane is not travelable.

* * * * *